US012345734B2

(12) United States Patent  
Farres et al.

(10) Patent No.: US 12,345,734 B2  
(45) Date of Patent: Jul. 1, 2025

(54) REDUNDANT WHEEL SPEED SENSOR IN SINGLE PACKAGE

(71) Applicant: Volvo Truck Corporation, Gothenburg (SE)

(72) Inventors: Lionel Farres, Heyrieux (FR); Khyatee Sethi, Saint-Priest (FR); Martin Monnier, Oullins (FR)

(73) Assignee: Volvo Truck Corporation, Gothenburg (SE)

( * ) Notice: Subject to any disclaimer, the term of this patent is extended or adjusted under 35 U.S.C. 154(b) by 197 days.

(21) Appl. No.: 17/973,916

(22) Filed: Oct. 26, 2022

(65) Prior Publication Data

US 2023/0184805 A1    Jun. 15, 2023

(30) Foreign Application Priority Data

Dec. 9, 2021 (EP) .................................. 21213396

(51) Int. Cl.
*B60T 8/32* (2006.01)
*G01P 3/487* (2006.01)

(52) U.S. Cl.
CPC .................................. *G01P 3/487* (2013.01)

(58) Field of Classification Search
CPC .................................................. G01R 31/007
See application file for complete search history.

(56) References Cited

U.S. PATENT DOCUMENTS

2007/0007823 A1*  1/2007  Huang ...................... H02J 1/08
                                                           307/52
2009/0276133 A1   11/2009  May et al.
2019/0054909 A1*  2/2019   Shah ........................ B60T 8/00
2019/0135272 A1   5/2019   Safstrom
2021/0323521 A1*  10/2021  Lee ......................... G01P 21/02

FOREIGN PATENT DOCUMENTS

| DE | 102015110965 A1 | 1/2016 |
| EP | 0586942 A1 | 3/1994 |
| EP | 3848210 A1 | 7/2021 |

OTHER PUBLICATIONS

Extended European Search Report for European Patent Application No. 21213396.1, mailed Jun. 10, 2022, 6 pages.

* cited by examiner

*Primary Examiner* — Alesa Allgood
(74) *Attorney, Agent, or Firm* — Withrow & Terranova, PLLC

(57) ABSTRACT

A wheel speed sensor system for a vehicle comprising at least one wheel speed sensor associated with a wheel of the vehicle, the at least one wheel speed sensor comprising first and second wheel speed sensing elements arranged in a single package to generate first and second sensed signals; first and second signal treatment units processing the sensed signals and generating first and second wheel speed signals; a signal combination unit communicatively coupled to the signal treatment units and to first and second electronic control units, to process and combine the wheel speed signals and simultaneously output a combined signal to the electronic control units; and a power management unit independently delivering electrical energy to the wheel speed sensing elements, the power management unit connected to the electronic control units so that the electrical energy is transferred from one or both the electronic control units to the power management unit.

20 Claims, 4 Drawing Sheets

REDUNDANT WHEEL SPEED SENSOR IN SINGLE PACKAGE

RELATED APPLICATIONS

The present application claims priority to European Patent Application No. 21213396.1, filed on Dec. 9, 2021, and entitled "REDUNDANT WHEEL SPEED SENSOR IN SINGLE PACKAGE," which is incorporated herein by reference in its entirety.

FIELD OF THE INVENTION

The invention relates generally to a redundant wheel speed sensor arrangement for a vehicle, specifically to a redundant wheel speed sensor system for a vehicle and to a method of operating such wheel speed sensor system.

BACKGROUND OF THE DISCLOSURE

In the field of automotive vehicles, reliable systems are important for providing high safety requirements. In particular, the braking function of a vehicle is of utmost importance ensuring smooth and secure traffic on roads even during emergency situations.

Therefore, there is an aim to develop a system capable of measuring the wheel speed of a vehicle with a high level of accuracy and robustness. In particular, a redundant braking system of a vehicle needs, for its proper function, reliable data related to the wheel speed information even in case of malfunction inside the system. It is also desirable for the wheel speed information to be redundantly distributed to the vehicle's subnet systems in cases where for instance a power supply unit is not operational.

As an example, US 2019/0054909 A1 (Document 1) describes systems and methods for redundant wheel speed sensing—a braking system. The braking system includes a first electronic control unit (ECU1) connected to a first power supply and a second electronic control (ECU2) unit connected to a second power supply. The second electronic control unit is communicatively coupled to the first electronic control unit. The braking system also includes a first wheel speed sensor, a second wheel speed sensor, a third wheel speed sensor, and a fourth wheel speed sensor. The first wheel speed sensor and the second wheel speed sensor are directly coupled to and powered by the first electronic control unit and are communicatively coupled to the second electronic control unit. The third wheel speed sensor and the fourth wheel speed sensor are directly coupled to and powered by the second electronic control unit and are communicatively coupled to the first electronic control unit.

Hence, in summary, each one of the wheel speed sensors is associated with the respective wheel of a vehicle. Each wheel speed information is provided to both electronic control units which are independently powered. Each control unit power and monitors a pair of wheel speed sensors but independently calculates each wheel speed.

As a drawback of the solution provided by Document 1, several issues can be identified:
  If the means of direct coupling is lost between the wheel speed sensor and its associated ECU, both ECUs lose the wheel speed information coming from the respective wheel speed sensor;
  If one of the ECUs is not working (e.g. not powered), both wheel speed sensors associated with the faulty ECU do not provide any wheel speed information to the system.

In addition, if the synchronization is not successful between the two ECUs, or the communication link between the two ECUs is broken, redundancy of the wheel speed information is lost since each of the ECUs become independent and no validation between the calculated wheel speed of each wheel speed sensor is provided.

Another drawback of the system of Document 1 is the power supply redundancy, that is not provided therein. Hence, if one of the ECU lost a power supply, both wheel speed sensors of the faulty ECU do not provide any wheel speed information to the system.

It is thus desirable to provide a system, where the wheel speed information is to be redundantly distributed to a vehicle's subnet systems such that in case of malfunction of a power supply or an electronic control unit, the redundancy provided within the system provides a continuous operation of the system, limiting distribution of faulty information across the system to ensure smooth operation of a vehicle.

SUMMARY OF THE DISCLOSURE

According to one aspect of the present invention, it is disclosed a wheel speed sensor system for a vehicle comprising:
  at least one a wheel speed sensor associated with a wheel of the vehicle, the at least one wheel speed sensor comprising a first wheel speed sensing element and a second wheel speed sensing element, wherein the first and second wheel speed sensing elements are arranged in a single package and configured to generate respectively a first sensed signal and a second sensed signal;
  a first signal treatment unit and a second signal treatment unit configured to process respectively the first and second sensed signals received from the first and second wheel speed sensing elements, and to generate respective a first wheel speed signal and a second wheel speed signal representative of a wheel speed;
  a signal combination unit communicatively coupled to the first and second signal treatment units and to a first and a second electronic control unit, said signal combination unit being configured to process and combine the first and second wheel speed signals received from the first and second signal treatment units and to simultaneously output a combined signal to the first and second electronic control units; and
  a power management unit configured to independently deliver electrical energy to the first and second wheel speed sensing elements, wherein the power management unit is connected to the first and second electronic control units so that the electrical energy is transferred from one or both the electronic control units to the power management unit.

Thanks to this arrangement, it is possible to provide the wheel speed sensor system, where redundancy is provided in terms of wheel speed information and power supply. In particular, the wheel speed sensor system is capable to provide a wheel speed signal even in case of malfunction of the first or second wheel speed sensing element. The redundancy is also provided thanks to delivering both wheel speed signals in the form of the combined signal to the two electronic control units (ECU). Hence, if one of the ECUs is faulty, the wheel speed information of the combined signal is still accessible and shareable by the respective ECU that is functional. In addition, the redundancy is further provided by the power management unit that is configured to independently provide the electrical energy to the first and second wheel speed sensing element. Hence, the system is capable of independently providing the electrical energy to the both wheel speed sensing elements even in scenarios where one of the power supplies (ECU) is not operational.

According to another aspect, the first and second wheel speed sensing elements are advantageously active wheel speed sensors.

Hence, it is possible to provide a high-quality sensed signal that is to be treated for determining the wheel speed information. Also, a combination of the two active wheel speed sensors provides a high level of precision and accuracy in terms of sensed velocity of the wheel. It is to be understood the precision and accuracy achieved by using two active wheel speed sensors is meant as the possibility of detection of the forward/backward movement of the associated wheel, with detection precision down to the 0 m/s.

According to yet another aspect, the first and second wheel speed sensing elements, the first and second signal treatment units, the signal combination unit, and the power management unit may be arranged in a common housing to form a single unit, connectable to the first and second electronic control units.

It is thus possible to provide a compact wheel speed sensor system, that is easy to be implemented into a suitable vehicle, minimizing the workload of the technician, while keeping the compactness in terms of size and weight for a limited volume of available space within a vehicle.

Further, in case of malfunction of the components incorporated, the simple change of the single unit may be performed, minimizing the maintenance time and extra costs.

According to yet another aspect, the signal combination unit may be configured to process and combine the first and second wheel speed signals received from the first and second signal treatment units, and output the combined signal to the two electronic control units based on an algorithm,
wherein said algorithm comprises steps of comparing the first and second wheel speed signals, and determining an integrity level index.

The integrity level index will be described in detail later in the description. The signal combination unit is configured such that the integrity level index is determined at least by one of the following:
averaging the first and second wheel speed signals received from the first and second signal treatment units whenever the values of the two wheel speed signals are within a predetermined level of discordance; or
taking a maximum value of the first and second wheel speed signals whenever the predetermined level of discordance between the two wheel speed signals is exceeded; or
discarding one of the wheel speed signals whenever the predetermined level of discordance between the two wheel speed signals is exceeded and one of the wheel speed signals is faulty.

Hence, the level of integrity can be understood as the output signal (e.g. combined signal) representing the output value of the two input wheel speed signals as the quality of the wheel speed measurement.

According to yet another aspect, the combined signal output from the signal combination unit may comprise a wheel speed information.

According to yet another aspect, the power management unit may be further configured to independently provide electrical energy to the first and second signal treatment units and the signal combination unit.

Since the electrical energy is independently provided between the components, a high level of redundancy is provided. The independent delivery of the electrical energy to the signal treatment units and the signal combination unit provides redundancy and a backup solution in case of malfunction.

According to yet another aspect, the power management unit may comprise a power multiplexer, wherein the power multiplexer is configured to receive electrical energy primarily from the first electronic control unit, and
in case of malfunction of the first electronic control unit, the power multiplexer is configured to receive electrical energy from the second electronic control unit, and
in case of malfunction of the second electronic control unit, the power multiplexer is configured to receive electrical energy from the first electronic control unit.

Hence, each of the ECUs is capable to substitute the power supply function of the other one. Thanks to this logical arrangement, it is possible to provide a backup power supply of the electrical energy to the associated components (wheel speed sensing elements, signal treatments units, signal combination unit) even in cases where one of the two ECUs is faulty or has a malfunction providing wrong data.

According to yet another aspect, the first and second electronic control units may be powered by at least one battery unit. In yet another aspect, the first and second electronic control units may be independently powered by two battery units.

Each of the above two configurations defining one or two independent battery units has its advantage. The single battery unit used for the two ECUs has the advantage of more compactness and less weight. On the other hand, the two battery units add the redundancy level of the entire system since it is possible to provide a full backup in terms of power supply in case of a faulty battery unit.

According to yet another aspect, the electrical energy transferred from one or both the electronic control units to the power management unit may be in the form of a direct current supply.

The advantage of having the system that is powered by the direct current supply is the absence of any limitation or regulation device within the wheel speed sensor system. Hence, a reliable system of powering logic is provided, suitable for a limited volume of space.

According to yet another aspect, the wheel speed sensor system may further comprise an external information unit configured to provide additional information to the signal combination unit. Advantageously, the additional information comprises at least a brake temperature information of the vehicle and/or a tyre pressure of the vehicle.

The additional channel of external information may provide more complex status information of the wheel speed sensor system and the vehicle as such, which can be used as variable inputs for more precise determination of the wheel speed. Alternatively, the additional information provided to the signal combination unit may be delivered to the first and second ECUs using the existing data channel in the form of the combined signal. The ECUs may then spread/deliver the additional information to a subnet of the vehicle such as a dashboard interface. Hence, an advantage of having the external information unit connected to the signal combination unit is to provide capacity to share some of the data for the determination of the wheel speed, and to limit a number of connectors going to the ECUs that would be otherwise needed in case of direct coupling between the external information unit and the first and second ECU.

According to yet further aspect, a vehicle having at least one wheel is provided, wherein the at least one wheel is communicatively connected to the wheel speed sensor system. Advantageously, the vehicle is an autonomous vehicle.

According to yet another aspect, a method of operating the wheel speed sensor system, comprising:

generating, by the first wheel speed sensing element and the second wheel speed sensing element, the respective first sensed signal and the second sensed signal;

processing, by the first signal treatment unit and the second signal treatment unit, the respective first and second sensed signals received from the first and second wheel speed sensing elements, and generating the respective first wheel speed signal and the second wheel speed signal representative of a wheel speed;

processing and combining, by the signal combination unit, the first and second wheel speed signals received from the first and second signal treatment units, and simultaneously outputting a combined signal to the first and second electronic control units;

transferring, from one or both the electronic control units, the electrical energy to the power management unit, such that the power management unit delivers the electrical energy to the first and second wheel speed sensing elements independently.

According to yet another aspect, the step of processing and combining the first and second wheel speed signals received from the first and second signal treatment units by the signal combination unit may be based on an algorithm, wherein said algorithm comprises steps of comparing the first and second wheel speed signals, and determining an integrity level index.

According to yet another aspect, determining the integrity level index may comprise one of the following:

averaging the first and second wheel speed signals received from the first and second signal treatment units whenever the values of the two signals are within a predetermined level of discordance; or taking a maximum value of the first and second signals whenever the predetermined level of discordance between the two signals is exceeded; or discarding one of the signals whenever the predetermined level of discordance between the two signals is exceeded and one of the signals is faulty.

According to yet another aspect, the step of transferring the electrical energy to the power management unit may be controlled by the power multiplexer of the power management unit such that the electrical energy is primarily received from the first electronic control unit, and in case of malfunction of the first electronic control unit, the electrical energy is received from the second electronic control unit, and in case of malfunction of the second electronic control unit, the electrical energy is received from the first electronic control unit.

According to yet another aspect, the power management unit may further deliver the electrical energy independently to the first and second signal treatment units, and the signal combination unit.

According to yet another aspect, the method may further comprise receiving, by the signal combination unit, additional information from an external information unit, wherein the additional information comprises at least a brake temperature information of the vehicle and/or a tyre pressure of the vehicle.

According to yet another aspect, the method may further comprise powering, by at least one battery unit, the first and second electronic control units. In yet another aspect, the method may further comprise powering, by two battery units, the respective first and second electronic control units.

BRIEF DESCRIPTION OF THE DRAWINGS

Other features and advantages of the invention appear from the following detailed description of some of its embodiments, given by way of non-limiting example, and with reference to the accompanying drawings, in which.

DETAILED DESCRIPTION OF THE DISCLOSURE

In the figures, the same references denote identical or similar elements, unless stated otherwise.

Figure 1:
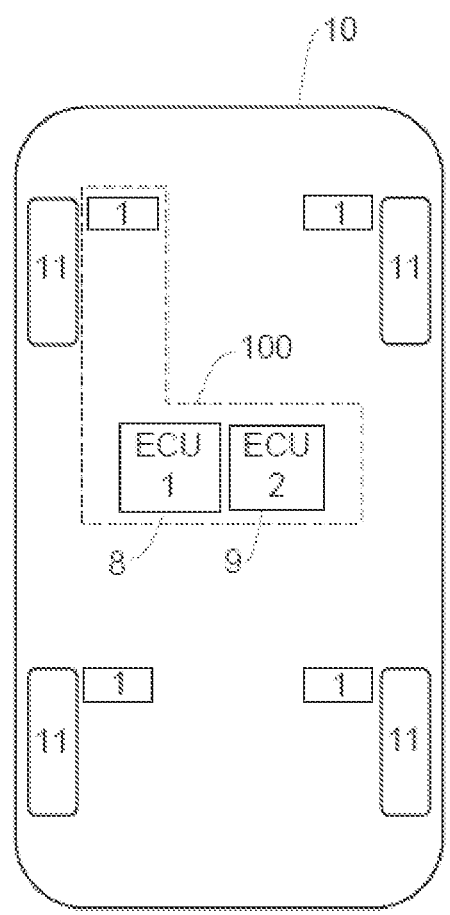
FIG. 1 shows a schematic representation of a vehicle incorporating a system of the present invention.

FIG. 1 shows a schematic representation of an exemplary vehicle 10 that may be equipped with a wheel speed sensor system 100. The vehicle 10 may be any type of suitable vehicle, preferably an eco-friendly vehicle such as an electric car, electric truck, or an electric bus. More preferably, the vehicle 10 may be an autonomous vehicle. The autonomous vehicle can be understood as a vehicle that is capable to be driven fully automatically for a certain period of time, without or with minimal interaction of a driver. The autonomous vehicle is thus capable to provide a full autonomous operation of systems, such as a control system of the vehicle 10 incorporating at least a braking system necessary for reliable traction and deceleration of the vehicle 10.

In general, the braking system of the autonomous vehicles requires a certain level of reliability and redundancy to meet ASIL-D requirements (Automotive Safety Integrity Level). For this purpose, FIG. 1 shows the wheel speed sensor system 100 that might be, in some implementations, part of the braking system of the vehicle 10. The vehicle 10 of FIG. 1 comprises four wheels 11 attached respectively to two-wheel axles. The vehicle 10 of FIG. 1 is only one example among others: other suitable types of vehicles may incorporate the same wheel speed sensor system 100 while having more than four wheels 11. For instance, the wheel speed sensor system 100 can be incorporated to a truck or a bus, having for instance three-wheel axles (also known as "6*2 trucks") onto each at least two wheels are attached.

The wheel speed sensor system 100 may be communicatively connected to a magnetic target T provided on the at least one wheel 11 of the vehicle 10. Typically, this magnetic target T is a magnet installed on wheel rim (not shown). According to one specific example, the target T is comprised of a magnet made of succession of poles North (N) and South (S) distributed alternatively all around the wheel rim. For schematic purposes, FIG. 1 shows the wheel speed sensor system 100 that is associated with one (front-left) wheel 11 of the vehicle 10. However, it is to be understood that one wheel speed sensor system 100 is associated with each wheel 11 of the vehicle 10. Preferably, the communication between the wheel speed sensor system 100 and the magnetic target T is contactless.

The wheel speed sensor system 100 comprises at least one wheel speed sensor 1 that is associated with a respective wheel 11 of the vehicle 10. The number of wheel speed sensors 1 is variable and dependent on the number of wheels 11 of the vehicle for which the system is designed. As schematically shown in FIG. 1, the exemplary vehicle 10 has four wheel speed sensors 1, each one associated with one respective wheel 11 of the vehicle 10.

Figure 2:
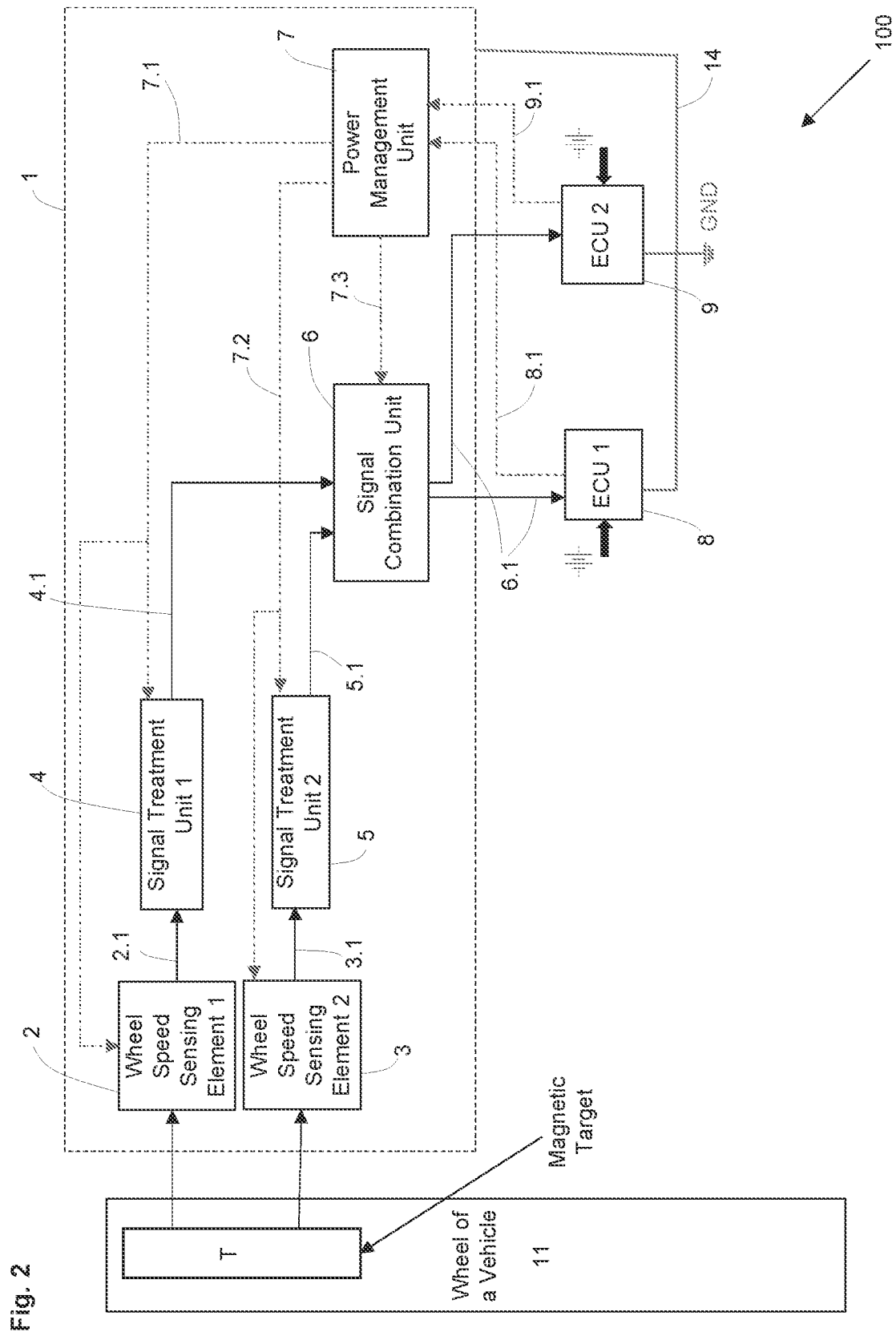
FIG. 2 shows a schematic layout of a system of the present invention.

Referring now to FIG. 2, showing a schematic layout of the wheel speed sensor system 100 of the present invention, the wheel speed sensor 1 comprises a first wheel speed sensing element 2 and a second wheel speed sensing element 3 that are configured to generate respectively a first sensed signal 2.1 and a second sensed signal 3.1. In the example, each one of the first and second sensing elements 2 and 3 is a magnetometer, measuring magnetic flux variation. Since magnetic flux lines are loops oriented from North poles to South poles, there is a change of direction of magnetic flux at each new pair of poles (N and S) on the magnet circumference. In detail, magnetic flux lines/loops extend outwardly from each North pole to two adjacent South poles S. It is specifically this change of flux direction that is detected by magnetometers 2 and 3: Wheel speed can then be obtained as the quotient between 1 and the frequency at which magnetic flux changes of direction (v=1/f).

More specifically, the first wheel speed sensing element 2 is configured to generate the first sensed signal 2.1. Consequently, the second wheel speed sensing element 3 is configured to generate the second sensed signal 3.1. Preferably, the first and second wheel speed sensing elements (2, 3) are active wheel speed sensors. The active wheel speed sensor has the advantage of providing a high-quality signal and of being capable of detecting very slow motion of the vehicle, i.e. speeds close to 0 m/s.

To provide the first and second sensed signals (2.1, 3.1), each one of the wheel speed sensing elements (2, 3) is configured to monitor the speed of the individual wheel 11 of the vehicle 10. The sensed speed and consequently, the generated first and second sensed signals (2.1, 3.1) may be, for instance, in the form of "highs" and "lows". The sensed signal (2.1, 3.1) may be thus represented by a sinusoid (sine wave) in the case of analog wheel speed sensing elements (2, 3). Alternatively, the sensed signal (2.1, 3.1) may be in the form of "peaks" and "valleys" of a square wave in the case of digital wheel speed sensing elements (2, 3). The sensed signals (2.1, 3.1) and their characteristics ("highs" and "lows", "peaks" and "valleys") are related to the frequency of the rotation of the respective wheel 11.

The first wheel speed sensing element 2 and the second wheel speed sensing element 3 are arranged in a single package.

In the example, the first and second wheel speed sensing elements (2, 3) are arranged side by side in orthoradial direction within the package so as to have a phase shift in the respective two sensed signals (2.1, 3.1). It is thus possible, based on the differences between the two sensed signals (2.1, 3.1), to determine whether the vehicle 10 is performing a forward or backward motion within a very short period, e.g. within a few milliseconds.

The wheel speed sensor system 100 further comprises a first signal treatment unit 4 and a second signal treatment unit 5 that are configured to process respectively the first and second sensed signals (2.1, 3.1) received from the first and second wheel speed sensing elements (2, 3), and to generate respective a first wheel speed signal 4.1 and a second wheel speed signal 5.1 representative of the wheel speed/frequency. The signal treatment unit (4, 5) is thus configured to treat/process the respective signal received from the first and second wheel speed sensing elements (2, 3). The signal treatment unit (4, 5) may be understood as a logical/electronic circuit that is capable to treat/process the respective signal received from the first and second wheel speed sensing elements (2, 3). The processed signal is output in the form of wheel speed associated with the corresponding frequency. More particularly, the first signal treatment unit 4 is configured to receive and process the first sensed signal 2.1 and generate the first wheel speed signal 4.1 that can be interpreted as a wheel speed "v1" having a corresponding frequency "f1". Also, the second signal treatment unit 5 is configured to receive and process the second sensed signal 3.1 and generate the second wheel speed signal 5.1 that can be interpreted as a wheel speed "v2" having a corresponding frequency "f2".

The wheel speed sensor system 100 further comprises a signal combination unit 6 that is communicatively coupled/connected to the first and second signal treatment units (4, 5). As will be described later in the description, the signal combination unit 6 is also communicatively coupled/connected to a first electronic control unit (ECU) 8 and to a second electronic control unit (ECU) 9. The signal combination unit 6 is configured to process and combine the first and second wheel speed signals (4.1, 5.1) received from the first and second signal treatment units (4, 5) and to simultaneously output/generate a combined signal 6.1 that is sent to the first and second ECUs (8, 9). The signal combination unit 6 may be understood as a logical/electronic circuit that is capable to process and combine the first and second wheel speed signals (4.1, 5.1) received from the first and second signal treatment units (4, 5) and to simultaneously output/generate a combined signal 6.1 that is sent to the first and second ECUs (8, 9).

Preferably, the signal combination unit 6 is configured to process and combine the first and second wheel speed signals (4.1, 5.1) based on an algorithm. The algorithm may comprise the steps of comparing the first and second wheel speed signals (4.1, 5.1) and determining an integrity level index. The combined signal 6.1 may thus include the information of the integrity level index. The integrity level index may be preferably coded in 2 bits, representing the quality of the wheel speed measurement. Preferably, the signal combination unit 6 determines one of the three different integrity level indexes that might be represented as integrity level 1, integrity level 2, and integrity level 3. The integrity level 1 is to be understood as the most precise wheel speed measurement, the integrity level 2 is to be understood as an average wheel speed measurement, and the integrity level 3 is to be understood as not sufficient wheel speed measurement due to one faulty wheel speed sensing element (2, 3).

The determination of the integrity level index is to be now explained in more detail. As referred above, the input signals of the signal combination unit 6 are the first and second wheel speed signals (4.1, 5.1) that are represented by the respective first and second wheel speed (v1, v2) and the corresponding frequency (f1, f2). For calculation purposes, the algorithm of the signal combination unit 6 determines intermediate signals represented by an intermediate wheel speed "v" and a corresponding intermediate frequency "f". The output signals of the signal combination unit 6 are represented by the combined signal 6.1, for which the algorithm determines a combined wheel speed "$v_{sync}$" and a corresponding combined frequency "$f_{sync}$". The combined signal 6.1 is further associated with the integrity level index that is to be simultaneously delivered to the first and second ECUs (8, 9).

For the determination of the intermediate signals (v, f), the algorithm is configured as follows:
For integrity level index=1
If $$(f1 \neq 0) \text{ and } (f2 \neq 0) \text{ and } (f_{min} < |f2 - f1| < f_{max}), \text{ then}$$

$$f = \frac{f2 + f2}{2} \text{ and } v = \frac{v2 + v1}{2}$$

and integrity level index=1

The algorithm is thus configured to average the first and second wheel speed signals (4.1, 5.1) represented by f1, f2, v1, and v2, whenever the values of the two wheel speed signals (4.1, 5.1) are within a predetermined level of discordance. The level of discordance is the predetermined value representing an acceptable level of difference between the two input frequencies f1 and f2. The level of discordance is determined by two constants "$f_{min}$" and "$f_{max}$". The $f_{min}$ represents the predetermined minim value of difference whereas the $f_{max}$ represents the predetermined maximum value of difference. Hence, the difference between the two input frequencies (f1, f2) has to be within the interval determined by $f_{min}$ and $f_{max}$: ($f_{min} < |f2-f1| < f_{max}$).

For integrity level index=2
If only (f1≠0) and (f2≠0), then
f=max(f1, f2) and v=max(v2, v1) and integrity level index=2

The algorithm is thus configured to take a maximum value of the first and second wheel speed signals (4.1, 5.1) represented by f1, f2, v1, and v2, whenever the predetermined level of discordance between the two wheel speed signals (4.1, 5.1) is exceeded. As for the integrity level index 1, also the integrity level index 2 has the condition that none of the first and second wheel speed signals (4.1, 5.1) is equal to 0—e.g. the case where one of the wheel speed sensing elements (2, 3) is faulty or not operational.

For integrity level index=3 If [(f1≠0) and (f2=0)] or [(f2≠0) and (f1=0)], then
[(f=f1 when f2=0) or (f=f2 when f1=0)] and
[(v=v1 when v2=0) or (v=v2 when v1=0)] and
integrity level index=3

The algorithm is thus configured to discard one of the wheel speed signals (4.1, 5.1) represented by f1, f2, v1, and v2, whenever the predetermined level of discordance between the two wheel speed signals (4.1, 5.1) is exceeded and one of the wheel speed signals (4.1, 5.1) is faulty (equal to 0).

Once the integrity level index is determined, the output signals represented by the combined wheel speed and the corresponding combined frequency ($v_{sync}$, $f_{sync}$) are initialized with the value of the intermediate signals (v, f):

$$v_{sync} = v \text{ and } f_{sync} = f$$

The combined signals ($v_{sync}$, $f_{sync}$) representing wheel speed information and the integrity level index are then associated with the combined signal 6.1 that is to be simultaneously output to the first ECU 8 and the second ECU 9. The combined signal 6.1 is then processed by each ECU (8, 9) independently to determine redundancy of the wheel speed sensor system 100. Data processed in the ECUs (8, 9) may be then distributed to the other vehicle's 10 subnet systems (not shown in figures), as required.

The first ECU 8 and the second ECU 9 may be powered by at least one battery unit or any other suitable power supply unit. Preferably, as shown in FIG. 2, the first and second ECUs (8, 9) may be independently powered by two battery units or any other suitable power supply unit. Each of the above two configurations defining one or two independent battery units has its advantage. On one hand, using a single battery unit for the two ECUs (8, 9) has the advantage of more compactness and less weight. On the other hand, using two battery units, as shown in FIG. 2, add the redundancy level of the entire system 100 since it is possible to provide a full backup in terms of power supply in case of one faulty battery unit.

Hence, for the purpose of the present invention, it is to be understood that each one of the two ECUs (8, 9) provides electrical energy (8.1, 9.1) to the wheel speed sensor system 100. In particular, as shown in FIG. 2, the wheel speed sensor system 100 comprises a power management unit 7. The power management unit 7 is connected to the first and second ECUs (8, 9) so that the electrical energy (8.1, 9.1) is transferred from one or both the ECUs (8, 9) to the power management unit 7. Moreover, the power management unit 7 is configured to independently deliver electrical energy (7.1, 7.2) to the first and second wheel speed sensing elements (2, 3).

Thanks to this arrangement, redundancy is provided in terms of wheel speed information and power supply. In particular, the wheel speed sensor system 100 is capable to provide the combined signal (6.1) even in case of malfunction of the first or second wheel speed sensing element (2, 3). The redundancy is also provided thanks to delivering both wheel speed signals (4.1, 5.1) in the form of the combined signal 6.1 to the two ECUs (8, 9). Hence, if one of the ECUs (8, 9) is faulty, the wheel speed information of the combined signal 6.1 is still accessible and shareable by the respective ECU (8, 9) that is functional. In addition, the redundancy is further provided by the power management unit 7 that is configured to independently provide the electrical energy (7.1, 7.2) to the first and second wheel speed sensing element (2, 3). Hence, the system 100 is capable of independently providing the electrical energy (7.1, 7.2) to both wheel speed sensing elements (2, 3) even in scenarios where one of the ECUs (8, 9), powering the system 100, is not operational.

Preferably, the power management unit 7 may be configured to independently provide electrical energy to the first and second signal treatment units (4, 5) and to the signal combination unit 6. In summary, the first and second ECUs (8, 9) are configured to provide a power supply to the wheel speed sensor system 100. In particular, each one of the ECUs (8, 9) independently provides electrical energy to the power management unit 7. The power management unit 7 may be understood as a logical/electronic circuit that is capable to deliver the electrical energy to the subsequent units of the wheel speed sensor system 100 such as first and second wheel speed sensing elements (2, 3), first and second treatment units (4, 5), and the signal combination unit 6. Hence, for sufficient and full power supply of the wheel speed sensor system 100, at least one of the ECU (8, 9) needs to be functional.

Figure 4:
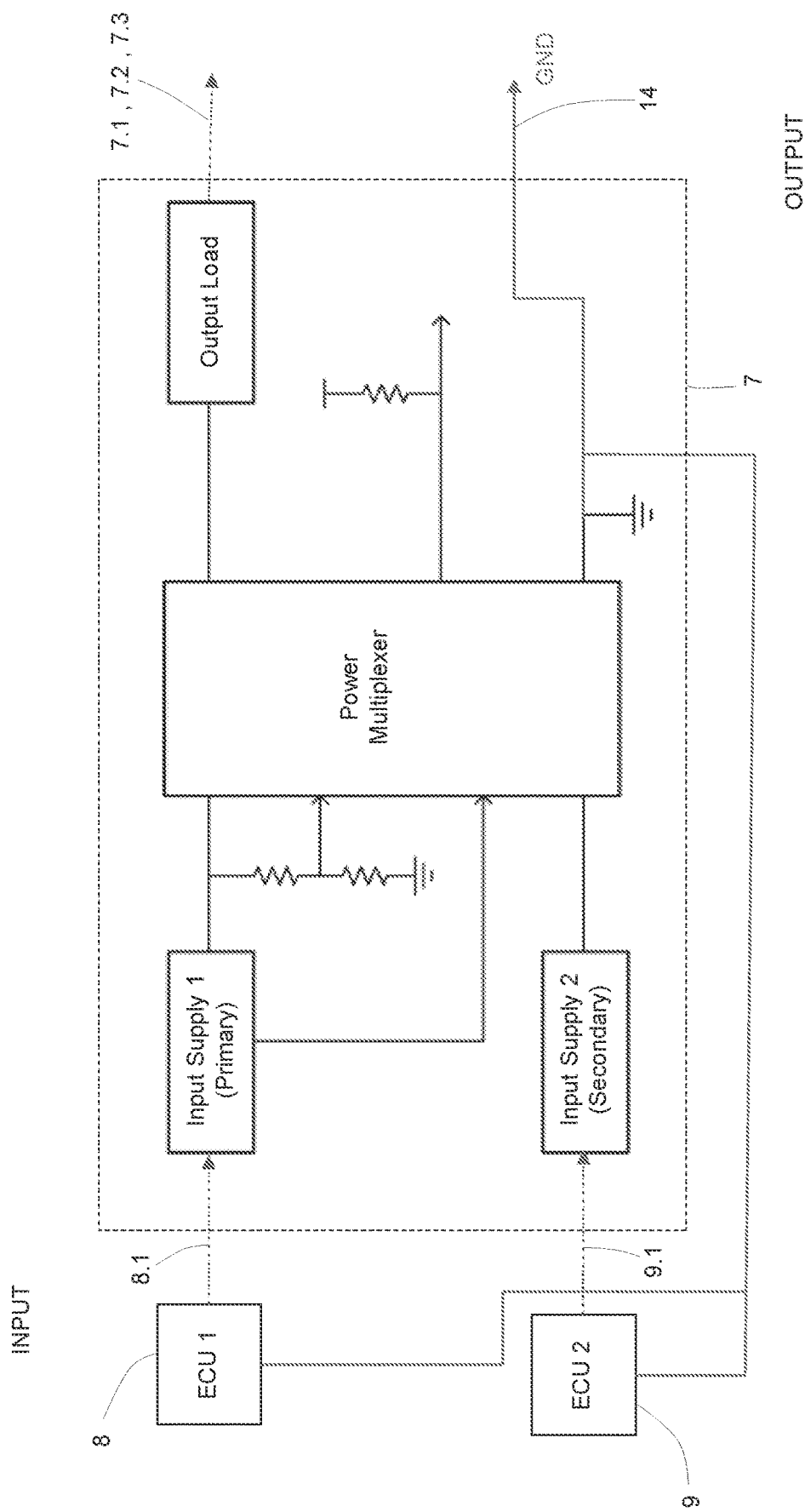
FIG. 4 shows a detailed schematic layout of a power management unit of the present invention.

In order to deliver the electrical energy to the subsequent units of the wheel speed sensor system 100 by the power management unit 7 from the first and/or second ECUs (8, 9), the power management unit 7 may comprise a power multiplexer. A non-limiting example of the power multiplexer is shown in FIG. 4. This ensures that the power supply (electrical energy 8.1 and 8.2) is always supplied to the wheel speed sensor system 100 and its subsequent units (2, 3, 4, 5, 6), even if there is a failure of one of the ECUs (8, 9).

The logical operations of the power multiplexer are to be now explained. When both the first and second ECUs (8, 9) are fully functional, the power multiplexer is configured to receive electrical energy 8.1 primarily from the first ECU 8. This scenario represents the common use of the power multiplexer powered by two power sources (fist ECU 8, second ECU 9) where the first ECU 8 has a priority. In case of malfunction of the first ECU 8, the power multiplexer is configured to receive the electrical energy 9.1 from the second ECU 9. Consequently, in case of malfunction of the second ECU 9, the power multiplexer is configured to receive the electrical energy 8.1 from the first ECU 8.

As exemplarily shown in FIG. 4, the first ECU 8 is connected to the power multiplexer on a "primary input supply 1" pin and the second ECU 9 is connected to the power multiplexer on a "secondary input supply 2" pin. The electrical energy (7.1, 7.2) provided to the subsequent units of the wheel speed sensor system 100 (the first and second wheel speed sensing elements (2, 3), first and second treatment units (4, 5), the signal combination unit 6) is output from the power multiplexer on "output load" pin, as shown in FIG. 4. The power multiplexer may advantageously work in two modes. The first mode is known as an automatic priority mode—prioritizing the first ECU 8 connected to the primary input pin of the power multiplexer and switches over the secondary input pin (connected to the second ECU 9) when the power of the first ECU 8 drops down. The second mode is known as a manual mode—allowing the user to manually switch between the first or second input pins, for powering the power multiplexer. As an example, the power multiplexer TPS2116 of Texas Instruments® may be used.

Preferably, the electrical energy (8.1, 9.1) transferred from the first and second ECUs (8, 9) to the power management unit 7 is in the form of a Direct Current (DC). The corresponding advantage is that no regulation device (e.g. AC/DC converter, a rectifier, a voltage limiting device) is required. The compactness of the wheel speed sensor system 100 complies with the limited volume of space available in the vehicle 10.

Advantageously, the first and second wheel speed sensing elements (2, 3), the first and second signal treatment units (4, 5), the signal combination unit 6, and the power management unit 7 may be arranged inside a common housing/package to form a single unit, that is connectable to the first and second ECUs (8, 9). A compact wheel speed sensor system 100 is thus provided, that is easy to be implemented into a suitable vehicle 10, minimizing the workload of the technician, while keeping the compactness in terms of size and weight for a limited volume of available space within a vehicle 10. Further, in case of malfunction of the components incorporated inside the wheel speed sensor system 100, the simple change of the single unit 1 may be performed, minimizing the maintenance time and extra costs.

The connection between the single unit and the first and second ECUs (8, 9) may be provided using a Y-cable, having a single common end connected to the single unit, and two other ends connected to the first and second ECUs (8, 9) respectively. Alternatively, the single unit may be equipped with a dual connector assembly having two connectors, where a first connector of the single unit is connected to the first ECU 8, and the second connector of the single unit is connected to the second ECU 9, using a different/separate cable.

Figure 3:
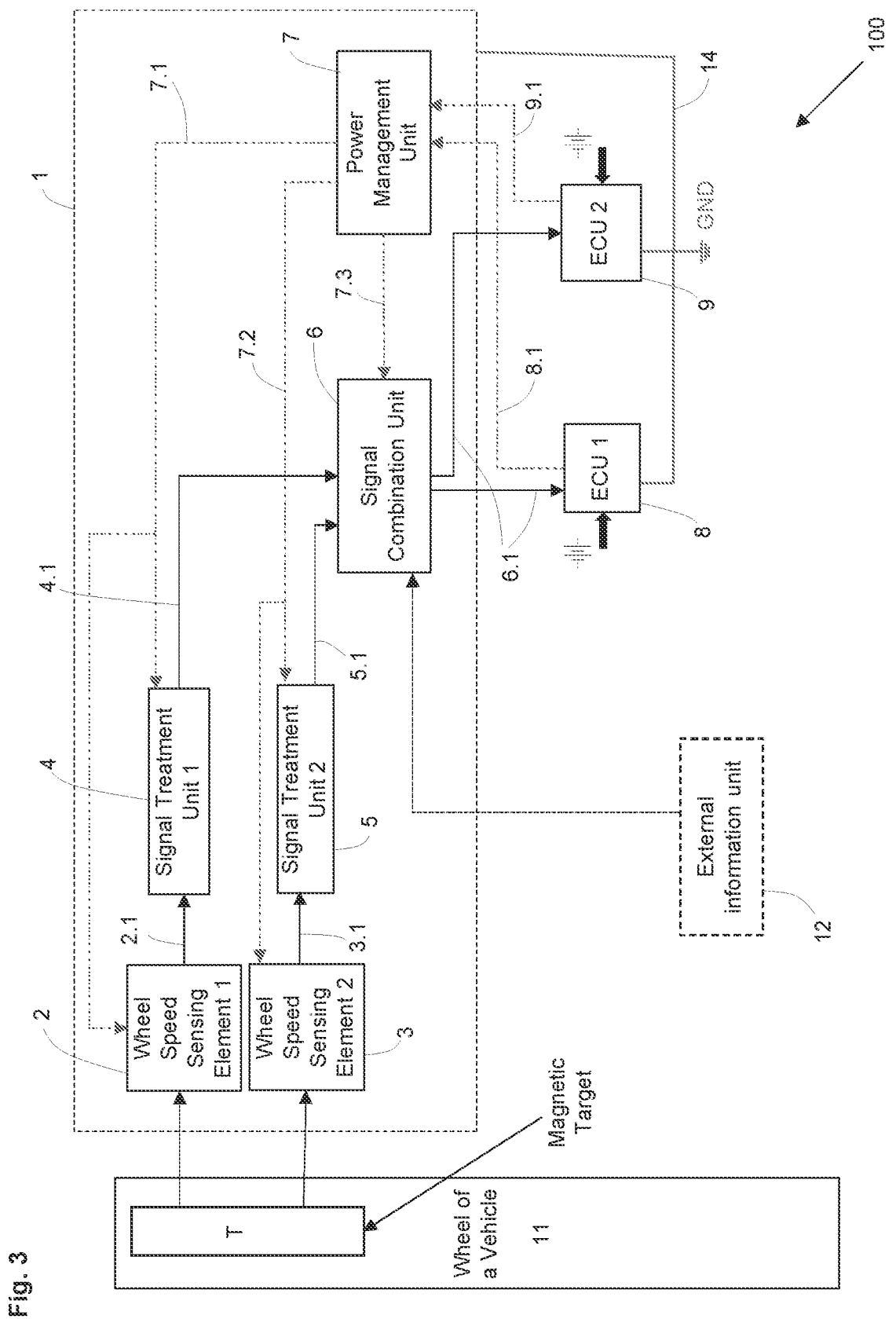
FIG. 3 shows a schematic layout of a system representing another embodiment of the present invention.

In addition, FIG. 3 shows a schematic layout of the wheel speed sensor system 100 of the present invention, where there may be provided an external information unit 12. The external information unit 12 is configured to provide additional information to the signal combination unit 6.

The additional information may be provided to the wheel speed sensor system 100 from various sources such as the braking system. The additional information may thus represent data from a bearing assembly of the wheel 11, brake temperature, or tyre pressure. All this data in the form of additional information may provide more complex status information of the wheel speed sensor system 100 and the vehicle 10 as such, which can be used as variable inputs for more precise determination of the wheel speed. Alternatively, the additional information provided to the signal combination unit 6 may be delivered to the first and second ECUs (8, 9) using the existing data channel in the form of the combined signal 6.1. The ECUs (8, 9) may then spread/deliver the additional information to a subnet of the vehicle 10 such as a dashboard interface. Hence, an advantage of having the external information unit 12 connected to the signal combination unit 6 is to provide capacity to share some of the data for the determination of the wheel speed, and to limit a number of connectors going to the ECUs (8, 9) that would be otherwise needed in case of direct coupling between the external information unit 12 and the first and second ECU (8, 9).

Further, with reference to the features of the wheel speed sensor system 100 as previously described and also with reference to FIGS. 1-4, the operation steps of the wheel speed sensor system 100 will be now described in more detail.

Having the wheel speed sensor system 100, the method of operating such system 100 comprises the following steps:
- generating, by the first wheel speed sensing element 2 and the second wheel speed sensing element 3, the respective first sensed signal 2.1 and the second sensed signal 3.1;
- processing, by the first signal treatment unit 4 and the second signal treatment unit 5, the respective first and second sensed signals (2.1, 3.1) received from the first and second wheel speed sensing elements (2, 3), and generating the respective first wheel speed signal 4.1 and the second wheel speed signal 5.1 representative of a wheel speed;
- processing and combining, by the signal combination unit 6, the first and second wheel speed signals (4.1, 5.1) received from the first and second signal treatment units (4, 5), and simultaneously outputting a combined signal 6.1 to the first and second ECUs (8, 9);
- transferring, from one or both the ECUs (8, 9), the electrical energy (8.1, 9.1) to the power management unit 7, such that the power management unit 7 delivers the electrical energy (7.1, 7.2) to the first and second wheel speed sensing elements (2, 3) independently.

Preferably, the signal combination unit 6 is configured to process and combine the first and second wheel speed signals (4.1, 5.1) based on an algorithm. The algorithm may comprise steps of comparing the first and second wheel speed signals (4.1, 5.1) and determining the integrity level index as already explained. The integrity level index may be thus determined as follows:
- averaging the first and second wheel speed signals (4.1, 5.1) received from the first and second signal treatment units (4, 5) whenever the values of the two signals (4.1, 5.1) are within the predetermined level of discordance; or
- taking a maximum value of the first and second signals (4.1, 5.1) whenever the predetermined level of discordance between the two signals (4.1, 5.1) is exceeded; or discarding one of the signals (4.1, 5.1) whenever the predetermined level of discordance between the two signals (4.1, 5.1) is exceeded and one of the signals (4.1, 5.1) is faulty.

Preferably, the step of transferring the electrical energy (8.1, 9.1) to the power management unit 7 is controlled by the power multiplexer of the power management unit 7. The electrical energy 8.1 is primarily received from the first ECU 8. In case of malfunction of the first ECU 8, the electrical energy 9.1 is received from the second ECU 9. Consequently, in case of malfunction of the second ECU 9, the electrical energy 8.1 is received from the first ECU 8.

The wheel speed sensor system 100 and the way how the wheel speed sensor system 100 operates thus represent a compact solution for the various types of vehicles 10, where the available volume of space is limited while providing a high level of accuracy and robustness for providing a high-quality wheel speed information for e.g. autonomous vehicles 10.

The invention claimed is:

1. A wheel speed sensor system for a vehicle comprising:
at least one wheel speed sensor associated with an individual wheel of the vehicle, the at least one wheel speed sensor comprising a first wheel speed sensing element and a second wheel speed sensing element, wherein the first and the second wheel speed sensing elements are arranged in a common housing to form a single unit implementable into the vehicle and connectable to a first electronic control unit and a second electronic control unit of the vehicle, wherein the first and the second wheel speed sensing elements are configured to monitor a speed of the individual wheel for generating respectively a first sensed signal and a second sensed signal;
wherein the at least one wheel speed sensor is configured to process respectively the first and the second sensed signals received from the first and the second wheel speed sensing elements, and to generate a respective first wheel speed signal and a second wheel speed signal representative of a wheel speed of said individual wheel;
wherein the at least one wheel speed sensor is configured to process and combine the first and the second wheel speed signals to simultaneously output a combined signal to the first and the second electronic control units; and
a power management unit configured to independently deliver electrical energy to the first and the second wheel speed sensing elements, wherein the power management unit is connected to the first and the second electronic control units so that the electrical energy is transferred from one or both of the electronic control units to the power management unit.

2. The wheel speed sensor system of claim 1, wherein the first and the second wheel speed sensing elements are active wheel speed sensors.

3. The wheel speed sensor system of claim 1, wherein the power management unit is arranged in the common housing to form the single unit, connectable to the first and the second electronic control units.

4. The wheel speed sensor system of claim 1, wherein processing and combining of the first and the second wheel speed signals to simultaneously output the combined signal to the first and second electronic control units are based on an algorithm,
wherein the algorithm comprises steps of comparing the first and the second wheel speed signals, and responsively determining an integrity level index.

5. The wheel speed sensor system of claim 1, wherein the combined signal output comprises a wheel speed information.

6. The wheel speed sensor system of claim 1, wherein the power management unit comprises a power multiplexer, wherein the power multiplexer is configured to receive electrical energy primarily from the first electronic control unit,
wherein in case of malfunction of the first electronic control unit, the power multiplexer is configured to receive electrical energy from the second electronic control unit, and
wherein in case of malfunction of the second electronic control unit, the power multiplexer is configured to receive electrical energy from the first electronic control unit.

7. The wheel speed sensor system of claim 1, wherein the first and the second electronic control units are powered by at least one battery unit.

8. The wheel speed sensor system of claim 1, wherein the first and the second electronic control units are independently powered by two battery units.

9. The wheel speed sensor system of claim 1, wherein the electrical energy transferred from one or both of the electronic control units to the power management unit is in the form of a direct current supply.

10. The wheel speed sensor system of claim 1, wherein the wheel speed sensor system further comprises an external information unit configured to provide additional information to the at least one wheel speed sensor to combine the first and second wheel speed signals.

11. The wheel speed sensor system of claim 10, wherein the additional information comprises at least a brake temperature information of the vehicle and/or a tire pressure of the vehicle.

12. A vehicle having at least one wheel, wherein the at least one wheel is communicatively connected to the wheel speed sensor system of claim 1.

13. The vehicle of claim 12, wherein the vehicle is an autonomous vehicle.

14. A method of operating the wheel speed sensor system of claim 1, comprising:
monitoring a speed of the individual wheel, by the first wheel speed sensing element and the second wheel speed sensing element, for generating the respective first sensed signal and the second sensed signal;
processing the respective first and the second sensed signals and generating the respective first wheel speed signal and the second wheel speed signal representative of a wheel speed of the individual wheel;
processing and combining the first and the second wheel speed signals and simultaneously outputting a combined signal to the first and the second electronic control units; and
transferring, from one or both of the first and second electronic control units, the electrical energy to the power management unit, such that the power management unit delivers the electrical energy to the first and the second wheel speed sensing elements independently.

15. The method of claim 14, wherein:
the power management unit comprises a power multiplexer, the step of transferring the electrical energy to the power management unit is controlled by the power multiplexer of the power management unit such that the electrical energy is primarily received from the first electronic control unit, and in case of malfunction of the first electronic control unit, the electrical energy is received from the second electronic control unit, and in case of malfunction of the second electronic control unit, the electrical energy is received from the first electronic control unit.

16. The method of claim 14, further comprising:

receiving additional information from an external information unit, wherein the additional information comprises a brake temperature information of the vehicle and/or a tire pressure of the vehicle.

17. The method of claim 14, wherein the method further comprises powering, by at least one battery unit, the first and the second electronic control units.

18. The method of claim 14, wherein the method further comprises powering, by two battery units, the respective first and the second electronic control units.

19. The method of claim 14, wherein the step of processing and combining the first and the second wheel speed is based on an algorithm, wherein the algorithm comprises steps of comparing the first and the second wheel speed signals, and responsively determining an integrity level index.

20. The method of claim 19, wherein determining the integrity level index comprises one of the following:

averaging the first and the second wheel speed signals whenever the values of the two signals are within a predetermined level of discordance;

taking a maximum value of the first and the second wheel speed signals whenever the predetermined level of discordance between the first and the second wheel speed signals is exceeded; or discarding one of the first and the second wheel speed signals whenever the predetermined level of discordance between the first and the second wheel speed signals is exceeded and one of the wheel speed signals is faulty.

\* \* \* \* \*